July 23, 1968 J. J. BECKERING ET AL 3,393,573
BELT TENSIONING CONSTRUCTION FOR COMPACT BELT SANDER
Filed Sept. 19, 1966 — 2 Sheets-Sheet 1
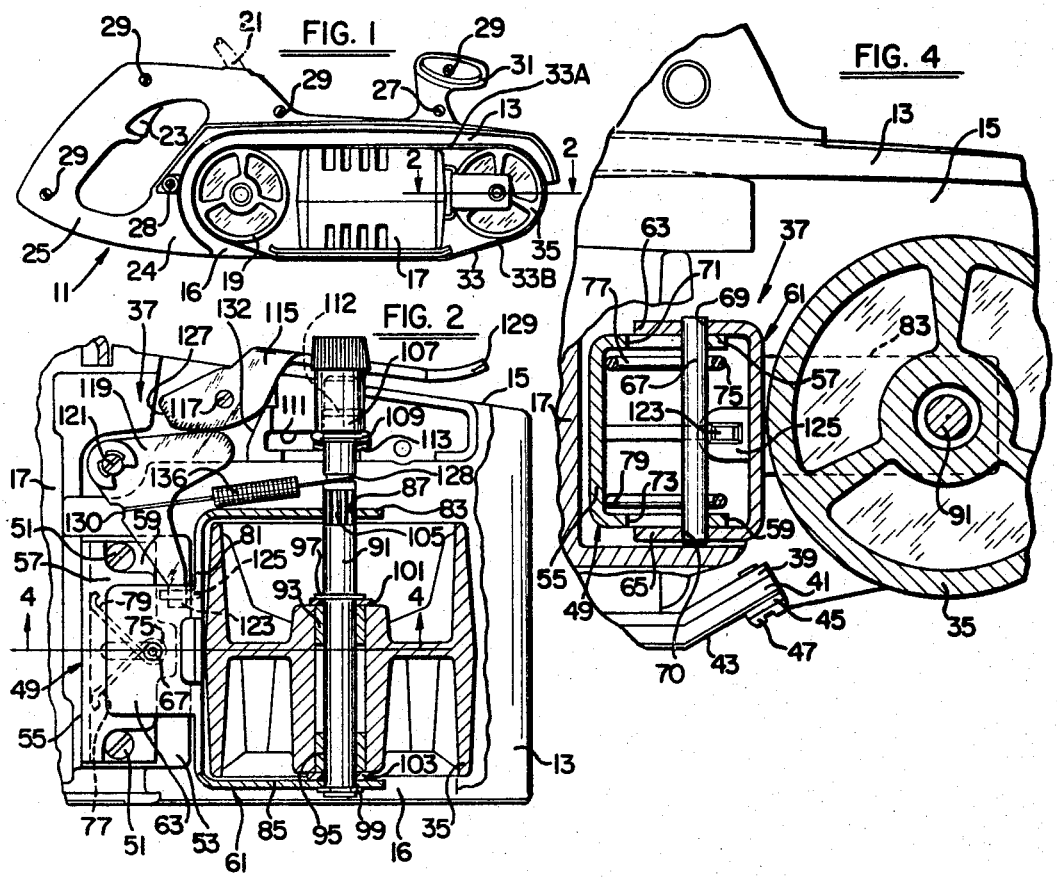
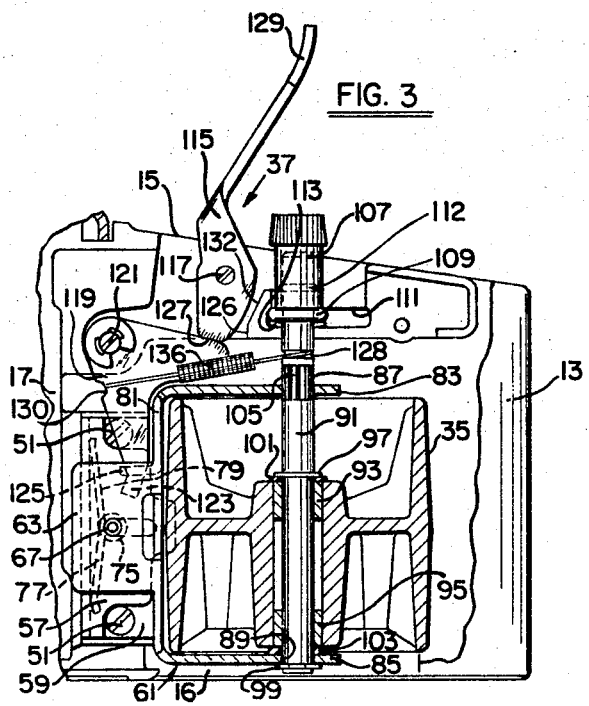
INVENTOR
JACOBUS J. BECKERING
LEWIS H. ROHR
BY Joseph R. Slotnik
ATTORNEY July 23, 1968    J. J. BECKERING ET AL    3,393,573
BELT TENSIONING CONSTRUCTION FOR COMPACT BELT SANDER
Filed Sept. 19, 1966    2 Sheets-Sheet 2
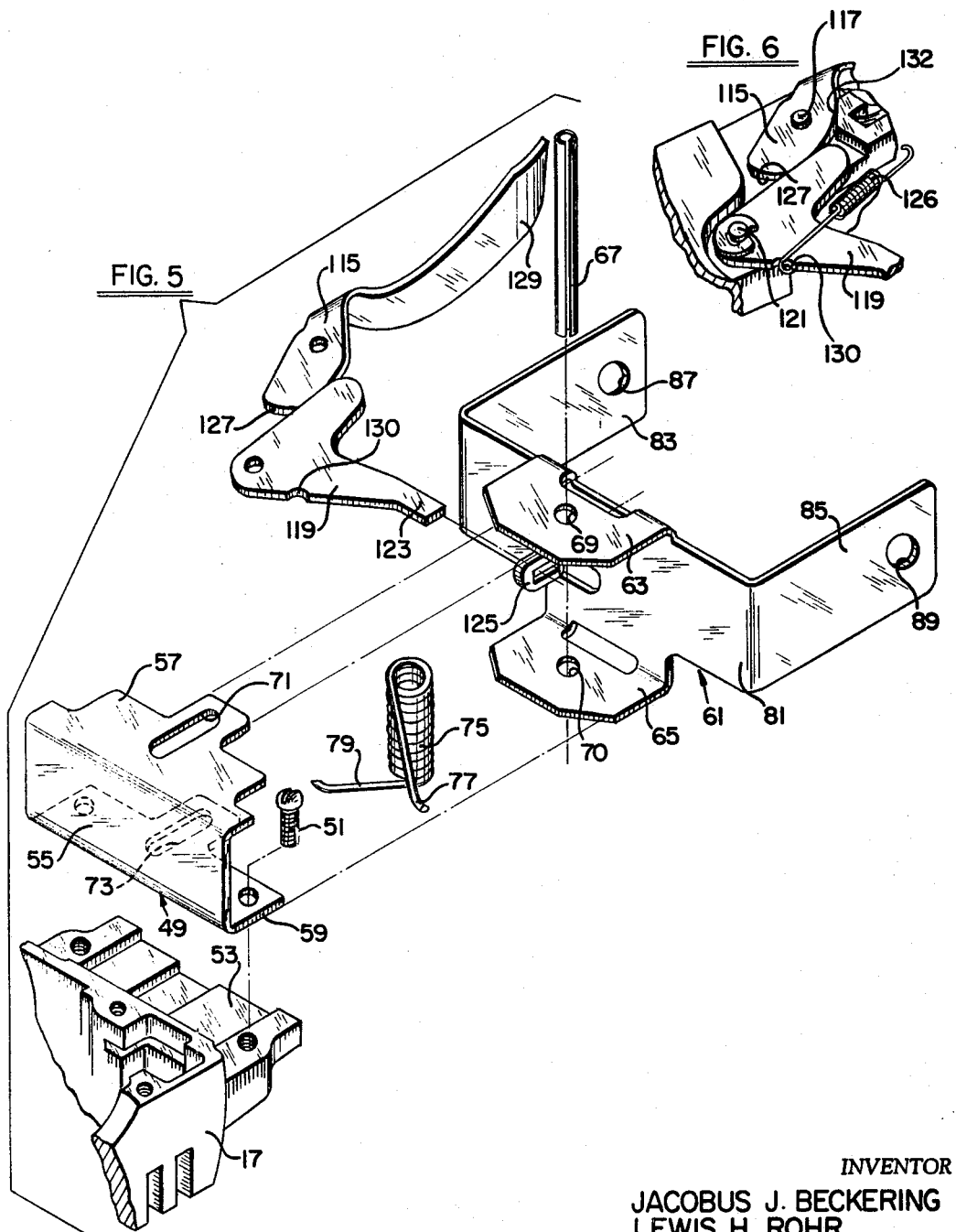
INVENTOR
JACOBUS J. BECKERING
LEWIS H. ROHR
BY Joseph R. Slotnik
ATTORNEY

United States Patent Office 3,393,573
Patented July 23, 1968

3,393,573
BELT TENSIONING CONSTRUCTION FOR COMPACT BELT SANDER
Jacobus J. Beckering, Bel Air, and Lewis H. Rohr, Baltimore, Md., assignors to The Black and Decker Manufacturing Company, Towson, Md., a corporation of Maryland
Filed Sept. 19, 1966, Ser. No. 580,367
12 Claims. (Cl. 74—242.14)

ABSTRACT OF THE DISCLOSURE

The device disclosed herein is a portable, belt-type sander which includes a housing having longitudinally spaced pulley means rotatably supported thereon and which are adapted to have an endless belt entrained thereover. An electric motor is positioned within the belt and between the pulley means and drives one of the pulley means. The other pulley means is supported and carried by novel means whereby the other pulley means is adjustable toward and away from and angularly relative to the driven pulley means.

---

An important object of the present invention is to provide an improved belt tensioning construction for compact belt-type sanding devices and the like which employ a driving motor disposed directly within the belt, which construction requires a minimum of space and does not interfere with or obstruct other operating parts of the device thereby providing an overall, axially compact and well balanced device.

Another important object of the present invention is to provide an improved belt tensioning construction of the above character which maximizes the available drive motor space within the housing and therefore permits use of a larger, more powerful motor therewith.

Another important object of the present invention is to provide an improved belt tensioning construction of the above character wherein only a minimum of structure therefor is disposed exteriorly of the device and that which is exterior is positioned at and closely adjacent one side thereof thereby minimizing obstruction to use of the device and enhancing its appearance.

Additional important objects of the present invention are to provide an improved belt tensioning construction of the above character which accommodates tolerances in the belt length and has a relatively high mechanical advantage factor which facilitates easy manipulation thereof.

Further objects include the provision of a belt tensioning construction of the above character which is relatively inexpensive to manufacture, rugged in construction and reliable in use.

Other objects and advantages of the present invention will become more apparent from a consideration of the following detailed description taken in conjunction with the drawings in which:

FIG. 1 is a side elevational view of a typical compact, belt sanding device embodying the present invention;

FIG. 2 is an enlarged sectional view of FIG. 1 taken along the line 2—2 thereof and showing the parts in belt-tensioning position;

FIG. 3 is a view, similar to FIG. 2, and showing the parts in position for belt removtal and/or replacement;

FIG. 4 is a sectional view of FIG. 2 taken along the line 4—4 thereof;

FIG. 5 is an exploded perspective view of the belt tensioning construction of the present invention; and FIG. 6 is a fragmentary perspective view illustrating the associated belt-tensioning lever construction of the present invention.

Broadly described, one aspect of the present invention relates to belt-type abrading, burnishing or polishing devices and the like of the type including a housing, a driving motor, drive and idler pulley means within said housing adjacent opposite ends thereof, said drive pulley means being driven by said motor, and belt means entrained over said drive and idler pulley means and having upper and lower runs, the improvement which comprises pulley bracket means within said housing and carrying said idler pulley means, support bracket means within and fixed to said housing and disposed in nesting relation with a portion of said pulley bracket means, spring means within said nesting bracket means and normally urging said pulley bracket means in one direction tensioning said belt, lever means pivoted on said housing and having a first portion within said housing and operatively engaging said pulley bracket means and a second portion extending outside said housing, said lever means when pivoted to a first position being adapted to move said pulley bracket means in a direction opposite said one direction and when pivoted to a second position being adapted to release said pulley bracket means for movement under the force of said spring means.

Referring now more specifically to the drawings, a compact belt sander, which is a typical device with which the present invention finds use, is illustrated generally at 11 in FIG. 1 and is seen to include a hollow, elongated main housing 13 having a side wall 15 along one side while the other side thereof is open, as shown at 16. An electric drive motor (not shown) is supported within a motor housing 17 disposed within the main housing 13 and which motor housing is integral with or otherwise suitably secured to the main housing 13. This motor is drivingly interconnected with a drive pulley 19 journaled within the main housing 13 and is energized by electric current from a power source connected to the motor by a line cord 21 and motor operation is controlled by a trigger switch 23. An end handle 25 has a forwardly extending ledge 24 adapted to seat beneath the main housing 13 and the handle 25 is secured to the housing 13 by screws 27, 28. The handle 25 is of clam-shell like configuration, being held together by screws 29, and the line cord 21, the trigger switch 23 and the other electrical control components are trapped within the handle 25 which also is provided with a front handle 31 to assist in manual control and guidance of the device.

An endless belt 33, being suitably formed for abrading, polishing or burnishing operations, is disposed within the main housing 13 and has an upper and a lower run 33a, 33b on opposite sides of the motor housing 17 and is entrained over the drive pulley 19 and an idler pulley 35 disposed within the forward end of the main housing 13. The idler pulley 35 is movably supported by a novel belt tensioning construction generally indicated at 37 which is adapted to selectively change the distance between centers of the pulleys 19, 35 and therefore position the pulleys for normal belt use, or removal and/or replacement thereof. A belt shoe 39 is secured to the lower end of the hollow housing 13 and may have a cork pad 41 and a thin, flexible, sheet metal pad liner 43 secured thereto in cantilever fashion by a retaining strip 45 and screws 47 to form a lower platen support for the belt lower run 33b in the usual manner.

It will be appreciated that the construction and arrangement of the main housing 13 and the motor housing 17 described above provides a highly compact, balanced and easily manipulated unit. In addition, it is desirable that the pulleys 19, 35 be constructed and arranged within the main housing 13 so as to facilitate use of standard sized belts 33, such as, for example, the conventional 3 by 24 inch belt. Of course, it will be appreciated that the device can be scaled up or down to accommodate larger or smaller standard belts, respectively. Furthermore, the belt tensioning construction 37 should be such that it occupies a minimum of space within the housing 13 so as not to obstruct other parts of the device nor limit the size of the drive motor, and such that exterior obstruction to use of the device and belt removal is minimized. Also, the belt tensioning construction 37 should be such that it is easily operable to facilitate quick belt removal and/or belt replacement.

To this end, the belt tensioning construction 37, seen best in FIGS. 2–6, includes a support bracket 49 secured by screws 51 to a boss 53 integral with or otherwise suitably secured to the motor housing 17. The support bracket 49 is generally U-shaped, as shown in FIG. 6, having an end wall 55 and generally parallel top and bottom walls 57, 59. A pulley bracket 61 is provided with a pair of rearwardly extending, generally parallel arms 63, 65 adapted to slidably receive the support bracket walls 57, 59. A pin 67 is snugly received in aligned openings 69, 70 in the bracket arms 63, 65 and is slidably received in elongated slots 71, 73 in the bracket walls 57, 59, respectively, to hold the brackets 49, 61 together while permitting pivotal as well as longitudinal movement of the pulley bracket 61 toward and away from the support bracket 49. The pin 67 carries a torsion spring 75 provided with straight tang portions 77, 79 adapted to engage the support bracket end wall 55 to normally bias the pulley bracket 61 away from the support bracket 49 or toward the right as seen in FIG. 4.

The pulley bracket 61 further includes a base 81 and a pair of forwardly projecting, generally parallel arms 83, 85 extending from either side of the bracket base 81. The arms 83, 85 have aligned openings 87, 89, respectively, formed therein to receive and support a non-rotatable pulley shaft 91. The idler pulley 35 is rotatably supported on the shaft 91 through sleeve or needle bearings 93, 95 and is held in place thereon by a pair of retaining rings 97, 99. A pair of washers 101, 103 are positioned between the ring 97 and the bearing 93 and between the bracket arm 85 and the bearing 95, respectively.

The portion of the pulley shaft 91 which extends through the bracket arm opening 87 is splined at 105 to interferingly engage in the opening 87 and prevent the shaft 91 from rotating. The outer end of the pulley shaft 91 has a knob 107 threaded thereon which knob has an enlarged annular bead 109 rotatably trapped in a recess 111 in the main housing side wall 15. The pulley shaft 91 preferably carries an O-ring 112 which frictionally engages the inner wall of the knob 107 to prevent the knob from turning inadvertently on the shaft 91 during use. A spring washer 113 is positioned on the shaft 91 between the bead 109 and one side of the recess 111 and when the knob 107 is turned, the shaft 91 together with the pulley 35 is moved axially. Since the pulley bracket 61 is pivoted on the mounting bracket 49 by the pin 67, this axial movement is translated to pivotal movement of the pulley 35 about the pin 67. The elongated configuration of the slot 111 permits the knob bead 109 to slide laterally during pivotal movement of the pulley 35 and this construction facilitates aligning the center of pressure on the pulley 35 with the center of resistance on the belt 33 so as to maintain the same path of travel of the belt 33 on the pulley 35 during use. Although the pin and slot connection 67, 111 is an integral part of the interconnecting means between the support and pulley brackets 49, 61, nevertheless the particular means which effects pivoting of the support bracket 61, i.e. the shaft 91, the knob 107, etc., form no part of the present invention, however, and is not described further here but for a better understanding thereof, reference may be made to the copending application of Jacobus J. Beckering, Ser. No. 590,026, filed Oct. 27, 1966 and owned by the assignee of the present invention.

In use, the torsion spring 75 normally biases the pulley bracket 61 toward the right to the position shown in FIG. 2. In this position of the parts, the belt 33 is tensioned on the drive and idler pulleys 19, 35 and when the drive motor is energized, rotation of the drive pulley 19 thereby moves the belt 33 and turns the idler pulley 35. When it is desired to remove and/or replace the belt 33, the idler pulley 35 is moved in a direction toward the drive pulley 19 thereby releasing the tension on the belt 33 so that it may be slid off on the pulleys 19, 35 by way of the open side 16 of the main housing 13.

To this end, an operating lever 115 is pivoted by a pin or screw 117 on the housing 13 at the side wall 15. The operating lever 115 has its inner end positioned to engage one end of a bell crank lever 119 also pivoted on the housing 13 by a pin or screw 121. The other end of the bell crank lever 119 has a projecting ear 123 received in a slotted tab 125 punched out of the pulley bracket base 81 so that when the operating lever 115 is pivoted in a counterclockwise direction from the position shown in FIG. 2 to the position shown in FIG. 3, the bell crank lever 119 pivots clockwise and through the engaged lever ear 123 and slotted tab 125 moves the pulley bracket 61 toward the left against the biasing force of the spring 75.

The pivot axis of the operating lever 115 is near its inner end and this together with the bell crank lever 119 provides a high mechanical advantage for the lever arrangement and therefore facilitates easy retraction of the pulley tensioning construction 37. In addition, the shape of the bell crank lever 119 allows it to be placed adjacent the pulley bracket 61 without interfering with movement thereof. The operating lever 115 has a flattened end 127 which engages the bell crank lever 119 in this position so that the lever 115 tends to remain in this position until force is applied thereto to pivot it back to the position shown in FIG. 2.

When the pulley bracket 61 is positioned as shown in FIG. 3, the belt 33 is easily removed and/or replaced simply by sliding it over the pulleys 19, 35. Thereafter, the operating lever 115 is pivoted in a clockwise direction whereupon the loaded torsion spring 75 moves the pulley bracket 61 toward the right and swings the bell crank lever 119 in a counterclockwise direction and the parts are again positioned as shown in FIG. 2. To insure full clockwise pivotal movement of the operating lever 115 a tension spring 126 has one end hooked over a groove 128 in the shaft 91 and the other end hooked over a notch 130 in the bell crank lever 119. In addition, the projecting ear 123 on the bell crank lever 119 is smaller than the slot in the tab 125 providing a small amount of lost-motion therebetween to accommodate slight tolerances in the belt length and insure both belt tautness and full clockwise retraction of the operating lever 115. The lever 115 is provided with a curved handle 129 which closely overlays the housing side wall 15 when the parts are positioned as shown in FIG. 2 but which facilitates easy manual grasping and manipulation thereof and when the operating lever 115 is positioned as shown in FIG. 2, it engages a tapered boss 132 on the housing 13.

It will be appreciated that by employing the nested supporting and pulley bracket relation, shown best in FIG. 4, together with the torsion spring 75 located therewithin, a highly compact and effective pulley retraction construction is achieved. In addition, the position of the slotted tab 125 relative to the nested brackets together with the construction and arrangement of the bell crank 119 and the operating lever 115 minimizes the space required by these parts within the housing 13 so that the overall dimensions of the device are kept to a minimum while retaining maximum usable space for the drive motor. Furthermore, the belt tensioning construction 37 has all its components located at the closed side of the housing 13 so that none of these parts interfere with removal and or replacement of either the belt 33 or the drive motor through the open side of the housing 13. In addition, only the handle portion 129 of the operating lever 115 is positioned outside the housing 13 and this handle closely overlays the housing side wall 15 during normal use of the device 11 so that this handle presents no problem of obstruction and, in fact, enhances the overall appearance of the device. Of course, no obstructions exist at the open side 16 of the main housing 13 so that the belt 33 at this side is effective in abrading, burnishing or polishing workpieces even to corners thereof.

By the foregoing, there has been disclosed an improved belt tensioning construction calculated to fulfill the inventive objects hereinabove set forth, and while a preferred embodiment of the present invention has been illustrated and described in detail, various additions, substitutions, modifications and omissions may be made thereto without departing from the spirit of the invention as encompassed by the appended claims.

We claim:

1. In a belt-type abrading, burnishing or polishing device of the type including a housing, a driving motor, drive and idler pulley means within said housing adjacent opposite ends thereof, said drive pulley means being driven by said motor, and belt means entrained over said drive and idler pulley means and having upper and lower runs, the improvement which comprises pulley bracket means within said housing and carrying said idler pulley means, support bracket means within and fixed to said housing and having a hollow portion disposed in nesting relation with a hollow portion of said pulley bracket means, means interconnecting said hollow nesting portions for sliding movement longitudinally relative to each other and for pivotal movement about an axis passing transversely therethrough, spring means within a cavity defined by said hollow nested bracket portions and normally urging said pulley bracket means in one longitudinal direction tensioning said belt, said pulley bracket means being adapted to be moved in a longitudinal direction opposite said one direction to relax tension on said belt.

2. A construction as defined in claim 1 wherein said support bracket is generally U-shaped in cross-section having a bottom wall and a pair of said walls disposed in nesting relation with a pair of generally parallel arms on said pulley bracket, pin means slidably interconnecting said nested bracket and arms and having a torsion spring disposed thereon, said spring having a pair of straight wire tangs engaging said support bracket at said bottom wall.

3. A construction as defined in claim 2 wherein said pin is received in openings in said arms and is slidable in slots formed in said support bracket side walls.

4. In a belt-type abrading, burnishing or polishing device of the type including a housing, a driving motor, drive and idler pulley means within said housing adjacent opposite ends thereof, said drive pulley means being driven by said motor, and belt means entrained over said drive and idler pulley means and having upper and lower runs, the improvement which comprises pulley bracket means within said housing and carrying said idler pulley means, support bracket means within and fixed to said housing and disposed in nesting relation with a portion of said pulley bracket means, spring means within said nesting bracket means and normally urging said pulley bracket means in one direction tensioning said belt, said spring means including a torsion spring disposed on a pin carried by one of said brackets and having at least one straight wire tang engaging the other of said brackets, lever means pivoted on said housing and having a first portion within said housing and operatively engaging said pulley bracket means and a second portion extending outside said housing, said lever means when pivoted to a first position being adapted to move said pulley bracket means in a direction opposite said one direction and when pivoted to a second position being adapted to release said pulley bracket means for movement under the force of said torsion spring.

5. In a belt-type abrading, burnishing or polishing device of the type including a housing, a driving motor, drive and idler pulley means within said housing adjacent opposite ends thereof, said drive pulley means being driven by said motor, and belt means entrained over said drive and idler pulley means and having upper and lower runs, the improvement which comprises pulley bracket means within said housing and carrying said idler pulley means, support bracket means within and fixed to said housing and disposed in nesting relation with a portion of said pulley bracket means, spring means within said nesting bracket means and normally urging said pulley bracket means in one direction tensioning said belt, lever means having a portion within said housing and a portion extending outside said housing and including a first lever engageable with said pulley bracket and pivoted on said housing about an axis normal to the direction of movement of said pulley bracket and a second lever pivoted on said housing about an axis normal to the direction of movement of said pulley bracket and engageable with said first lever, said first and second levers, when pivoted to a first position, being adapted to move said pulley bracket means in a direction opposite said one direction, and when pivoted to a second position being adapted to release said pulley bracket means for movement under the force of said spring means.

6. A construction as defined in claim 5 wherein said first lever is positioned within said housing and said second lever has a handle portion outside and adapted to closely overlay said housing when said lever means is in said second position.

7. A construction as defined in claim 5 wherein said pulley bracket has a slotted tab positioned between said arms, said first lever having a portion received in said tab.

8. A construction as defined in claim 5 wherein said first lever comprises a bell crank pivoted on said housing at its vertex and having its legs engageable with said pulley bracket and one end of said second lever, respectively, said second lever being pivoted on said housing at a point adjacent said one end.

9. A construction as defined in claim 5 wherein said second lever has a flattened end portion adapted to engage said first lever when said lever means is in said first position.

10. A construction as defined in claim 5 which includes a tension spring engaging said first lever and biasing it toward said second position.

11. A construction as defined in claim 7 wherein the slot in said tab is larger than said lever portion received therein thereby forming a lost motion connection between said first lever and said pulley bracket, and spring means engaging said first lever and biasing it toward said second position.

12. In a belt-type abrading, burnishing or polishing device of the type including a housing, a driving motor, drive and idler pulley means within said housing adjacent opposite ends thereof, said drive pulley means being driven by said motor, and belt means entrained over said drive and idler pulley means and having upper and lower runs, the improvement which comprises pulley bracket means within said housing and carrying said idler pulley means, support bracket means within and fixed to said housing and disposed in nesting relation with a portion of said pulley bracket means, first spring means within said nesting bracket means and normally urging said pulley bracket means in one direction tensioning said belt, lever means pivoted on said housing and having a first portion within said housing and operatively engaging said pulley bracket means, and a second portion extending outside said housing, said lever means when pivoted to a first position being adapted to move said pulley bracket means in a direction opposite said one direction and when pivoted to a second position being adapted to release said pulley bracket means for movement under the force of said first spring means, and second spring means normally biasing said lever means to said second position.

References Cited

UNITED STATES PATENTS

| | | | |
|---|---|---|---|
| 1,982,299 | 11/1934 | Hapgood | 74—242.11 |
| 2,289,481 | 7/1942 | Burleigh | 51—170 |
| 2,292,580 | 8/1942 | Moyer et al. | 74—242.13 XR |
| 2,304,809 | 12/1942 | Faber | 74—242.14 XR |
| 2,686,392 | 8/1954 | Moore | 51—148 XR |
| 2,696,123 | 12/1954 | Swan | 74—242.11 |
| 3,176,436 | 4/1965 | Anton | 51—170 |
| 3,312,116 | 4/1967 | Blevins | 74—242.11 XR |

FOREIGN PATENTS

| | | |
|---|---|---|
| 16,756 | 1914 | Great Britain. |
| 194,954 | 3/1923 | Great Britain. |

FRED C. MATTERN, JR., *Primary Examiner.*

J. A. WONG, *Assistant Examiner.*